| United States Patent [19] | [11] Patent Number: 5,061,769 |
|---|---|
| Aharoni | [45] Date of Patent: Oct. 29, 1991 |

[54] FLUOROPOLYMERS AND FLUOROPOLYMER COATINGS

[75] Inventor: Shaul M. Aharoni, Morris Plains, N.J.

[73] Assignee: Allied-Signal Inc., Morris Township, Morris County, N.J.

[21] Appl. No.: 628,541

[22] Filed: Dec. 17, 1990

[51] Int. Cl.$^5$ ............................................. C08F 20/22
[52] U.S. Cl. ................................................... 526/245
[58] Field of Search ........................................ 526/245

[56] References Cited

U.S. PATENT DOCUMENTS

| | | |
|---|---|---|
| 3,910,187 | 10/1975 | Cords . |
| 4,130,706 | 12/1978 | Plambeck, Jr. . |
| 4,293,674 | 10/1981 | Andrews . |
| 4,296,224 | 10/1981 | Fukui et al. ........................... 526/209 |
| 4,650,843 | 3/1987 | Yokoyama et al. . |
| 4,791,166 | 12/1988 | Saukaitis . |
| 4,812,337 | 3/1989 | Sugimura et al. .................... 524/520 |

FOREIGN PATENT DOCUMENTS

| | | | |
|---|---|---|---|
| 0121140 | 10/1984 | European Pat. Off. ............ 526/245 |
| 0234601 | 9/1987 | European Pat. Off. ............ 526/245 |
| 2151035 | 2/1973 | Fed. Rep. of Germany ...... 526/245 |
| 44-851 | 1/1969 | Japan ................................... 526/245 |
| 56-118408 | 9/1981 | Japan ................................... 526/245 |
| 57-51705 | 3/1982 | Japan ................................... 526/245 |
| 60-258218 | 12/1985 | Japan ................................... 526/245 |

*Primary Examiner*—Joseph L. Schofer
*Assistant Examiner*—N. Sarofim
*Attorney, Agent, or Firm*—Gerhard H. Fuchs; Ernest D. Buff

[57] ABSTRACT

Copolymer compositions derived from (a) perfluoralkylalkyl acrylate or methacrylate, (b) acrylic, methacrylic or itaconic acid, and (c) a hydroxyl-containing acrylate or methacrylate, in combination, can be cross-linked through internal esterification or anhydride formation. These product combine properties typical of fluorine-containing polymers with processability, including processability from solution.

26 Claims, No Drawings

FLUOROPOLYMERS AND FLUOROPOLYMER COATINGS

FIELD OF THE INVENTION

This invention relates to the field of fluropolymers having low surface energy, of the type suitable for protective coatings and release coatings, as well as to the field of optically clear polymers for optical coating and encapsulating applications.

BACKGROUND OF THE INVENTION

Fluropolymers have found widespread use in demanding applications where their non-stick properties, good thermal and chemical resistance, toughness and abrasion resistance are being used to advantage, such as in coatings.

The present invention provides new copolymers of fluorine-containing acrylic monomers with non-fluorinated acrylic monomers, which can be made under free-radical polymerization conditions. These copolymers are amorphous and optically clear, and have low refractive indexes. Being soluble in specific organic solvents, their solutions can be used to make coatings and to cast films, which are cross-linkable. These coatings are strongly adherent to substrates, including glass, polymer films and crystal substrates.

These new copolymers fill a need for coating materials which have the superior properties of fluoropolymers—such as low refractive index and surface energy, good thermal and chemical resistance—and which at the same time have strong adhesion, flexibility, toughness, and abrasion resistance. The polymeric compositions of the present invention combine these properties.

SUMMARY OF THE INVENTION

In accordance with the present invention, there are provided novel polymeric compositions comprising fluorinated copolymers having the general composition

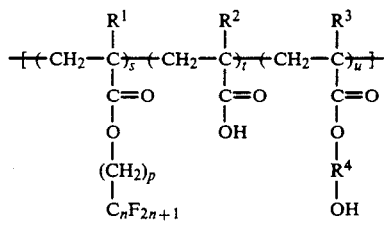

wherein
$R^1$ is H, $-CH_3$, or mixtures thereof;
$R^2$ is H, $-CH_3$, or $-CH_2COOH$;
$R^3$ is H, $-CH_3$, or $-CH_2COOC_mH_{2m+1}$,
wherein m is an integer of from about 1 to about 4;
$R^4$ is an alkylene bridging group, straight chain, branched or cyclic, having from 1 to about 8 carbon atoms;
p is 1 or 2;
r is an integer of from about 1 to about 8;
s, t and u represent weight proportions of the respective monomer-derived units, and have values within the ranges of
s = from about 0.5 to about 0.99;
t = from about 0.005 to about 0.495; and
u = from about 0.005 to about 0.495;
with the the sum of s+t+u being 1; and
n is an integer of from about 1 to about 40;
wherein the monomer-derived units may be arranged in any sequence. In the above formula, t and u may, but need not be the same.

The term copolymer, as used in the specification and claims, is intended to refer to a polymer derived from at least two or more, usually derived from at least three different monomer units. There is no theoretical limit on the number of different monomer units which may be incorporated into the polymeric compositions of the present invention; their number is limited only by the usual practical limitations imposed by polymerization process considerations, and the desire to obtain polymer products having useful properties.

The polymer compositions of this invention may also be described as being made up of a polymer chain composed of

wherein s, t and u have the meanings given in connection with formula (I), above, and wherein
X represents monomer-derived units of the composition

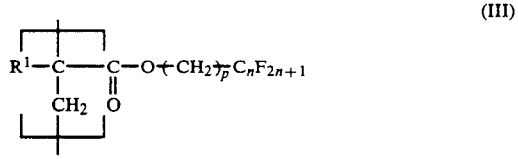

wherein $R^1$, p and n, which may be the same or different in individual X units within the polymer chain, have the meanings given in connection with formula (I), above;
Y represents monomer-derived units of the composition

wherein $R^2$, which may be the same or different in individual Y units within the polymer chain, has the meaning given in connection with formula (I), above; and
Z represents monomer-derived units of the composition

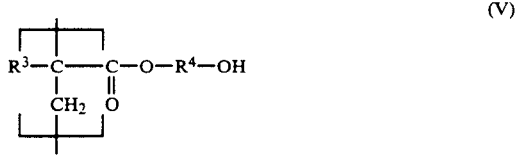

wherein $R^3$, $R^4$ and r, which may be the same or different in individual Z units within the polymer chain, also have the meanings given in connection with formula (I), above.

In the polymeric compositions of formula (II), above, the X, Y and Z units may be arranged in any sequence. This freedom of arrangement accordingly also prevails for formula (I), above, since formulas (I) and (II) are merely alternate expressions for the same polymeric compositions.

These copolymers can be prepared by polymerizing the monomers in tetrahydrofuran ("THF") or glacial acetic acid at elevated temperature with a free-radical generating initiator, using procedures conventionally employed in making acrylic and methacrylic polymers.

These copolymers are generally optically clear, without haze or inhomogeneities. They have refractive indexes below about 1.4, generally within the range of from about 1.365 to below about 1.4; good adhesion to glass, silicon, copper foil, polyimide, aromatic or aliphatic polyamide, e.g. nylon, polyethylene terephthalate, polytetrafluroethylene (PTFE), polychlorotrifluoroethylene and other similar substrates; low surface energy, about half that of PTFE; excellent thermal stability in air; in combination with good mechanical properties—they are neither brittle nor elastomeric. They are soluble (up to about 40 percent by weight of the combined weight of polymer and solvent) in about 1:1 THF/1,3-bis(trifluoromethyl)benzene (hereinafter also referred to as hexafluoroxylene). From such solutions, coatings can be applied to any suitable substrate. Their dielectric constant is in the order of about 3.

The present copolymers can be cross-linked by heat treatment without the use of cross-linking agents. Such heat-induced cross-linking can occur either through internal anhydride formation between two internal carboxyl groups situated on pendant groups of monomer-derived moieties; or by internal esterification between hydroxyl and carboxyl groups. Heat-induced cross-linking has the advantage that no cross-linking agent is required, so that no impurities are introduced; the cured polymer is a single component with no residual solvent, monomer or cross-linking agents. Such cross-linking improves hardness, scratch resistance and adhesion of the polymer film, without change in refractive index, and without deleterious effect on any other desirable property. Heat treatment within the temperature range of from about 130° C. to about 150° C. for time periods of from about 0.25 to about 10 hours, desirably of from about 1 to 4 hours, results mainly in esterification; heat treatment at higher temperatures, say within the range of from about 170° C. to about 180° C., results in significant anhydride formation. As a general proposition, higher temperatures and longer heat treatment times tend to promote anhydride formation. Cross-linking agents may also be employed, if desired, as to be discussed in further detail below.

The unique properties of the present copolymers are due to the presence of the fluorinated moiety in combination with moieties bearing carboxyl groups and moieties bearing hydroxyl groups. The fluorinated moieties provide the desirable properties of fluoropolymers, and the combination of the carboxyl groups and the hydroxl groups provides for processability and curability, properties which are typically lacking in conventional fluoropolymers.

The copolymers of this invention are suitable for use as optical coatings; anti-static coatings; release coatings; for encapsulation of electrical and optical devices and components; and for similar applications where their above-described combination of properties can be used to advantage. In powder form, they can be compression molded at temperature in the order of 100° C. to about 115° C. before cross-linking sets in, and then cross-linked at higher temperatures in the order of above about 120° C., say between about 130° C. to about 150° C.

DETAILED DESCRIPTION OF THE INVENTION

The following detailed description sets forth the preferred embodiments, and the examples set forth the best mode presently contemplated for the practice of the invention.

With reference to the "X" units of formula (II), above, which are in more detail defined by formula (III), above, these are derived from fluorine-containing acrylate or methacrylate monomers of the formula $$CH_2=CR^1CO-O-(CH_2)_p-C_nF_{2n+1}$$

wherein $R^1$, p and n have the meanings given above in connection with formula (II). Those monomers wherein p is 2 are commercially available, as mixtures of homologues having perfluoroalkyl groups of varying chain length, that is to say, as mixtures of homologues differing in "n", as they are ususally obtained in commercial manufacturing operations. Of course, one could separate out individual compounds of defined perfluoroalkyl chain length, if desired for any reason, but this is ordinarily not necessary. Indeed, if the copolymer is to be used for optical purposes, it is desirable to use monomer having a wider distribution of "n", since such wider distribution makes for better amorphicity, hence greater optical clarity, as will the use of mixtures of acrylates (wherein in the above formula $R^1$ is H) with methacrylates (wherein in the above formula $R^1$ is —$CH_3$). Those monomers wherein p is 1 can be prepared using known procedures. Preferably, p is 2 and n is an even number. In preferred embodiments, n ranges from about 2 to about 30, more preferably from about 4 to about 20. Specific examples of preferred embodiments are the products sold by DuPont under its "Zonyl" trademark, e.g. Zonyl TM (the methacrylate) and Zonyl TA-N (the acrylate), and sold by by Hoechst-Celanese under its "NUVA-HF" trademark. Such specific examples include mixed perfluaroalkylalkyl acrylates and methacrylates wherein n is predominantly an even number, and in particular wherein the perfluoroalkyl group is represented by a mixture of $C_4$ through $C_{20}$ groups, particularly $C_6$, $C_8$, $C_{10}$ and $C_{12}$ groups.

The "Y" units of formula (II), above, which are in more detail defined by formula (IV), above, are derived from acrylic acid, methacrylic acid, itaconic acid, or mixtures thereof. All of these are commercially available products.

The "Z" units of formula (II), above, which are in more detail defined by formula (V), above, are derived from acrylic acid esters of the formula $$CH_2=CR^3CO-O-R^4-OH$$

wherein $R^3$, $R^4$ and r have the afore-stated meanings. In more preferred embodiments, $R^3$ is H or —$CH_3$, with —$CH_3$ being most preferred. For optical applications, use of mixed acrylates and methacrylates may be desirable to maximize amorphicity, hence optical clarity. If $R^3$ is represented by —$CH_2COOC_mH_{2m+1}$, then m is preferably an integer of from about 0 to about 6, more preferably of from about 1 to about 4. With respect to the R⁴, alkylene bridging group, embodiments having from 2 to about 4 carbon atoms are preferred, as are the linear and branched chain embodiments. Use of mixtures of such monomers of differeing carbon-carbon chain length is contemplated. To enhance amorphicity, use of mixtures of such monomers of differeing carbon-carbon chain length is desirable and preferred. Many of the esters suitable for furnishing the "Z" units of formula (II), above, are commercially available; those not so available are readily prepared by those skilled in the art, using well-known procedures.

With regard to the weight proportions of the "X", "Y" and "Z" units (see formula II, above), s ranges from about 0.5 to about 0.99, and t and u, which may be the same or different, each range from about 0.005 to about 0495. The preferred range for t+u is from about 0.02 to about 0.35, with values in the range of from about 0.08 to about 0.3 being more preferred yet. As to the weight ratio between t and u (t:u), weight ratios in the range from about 1:0.5 to about 1:1.5 are preferred, with ratios in the range of from about 1:0.8 to about 1:1.2 being more preferred yet. Polymeric compositions of the present invention containing approximately equal proportions by weight of the "Y" and "Z" components have been shown to have desirable properties. If it is contemplated to subject the polymeric composition to heat-induced cross-linking, then the Y and Z components are desirably employed in about equimolar proportions (rather than in about 1:1 weight ratio). If equimolar proportions are employed, then the cross-linking process, as above described, proceeds predominantly by the internal esterification route, with minimal anhydride formation. For many applications, especially those involving prolonged exposure to aqueous media, particularly at elevated temperatures, the esterification route is preferred because of the better stability of the resultant product.

Polymerization of the monomers to make the compositions of this invention proceeds readily in solution in THF or glacial acetic acid, at elevated temperature within the range of from about 35° C. to the boiling point of the polymerization mixture, more desirably within the range of from about 45° C. to the atmospheric pressure boiling point of the solvent, about 65° C. for THF and about 110° C. for glacial acetic acid, under autogenous pressure, typically atmospheric pressure, using a free radical generating initiator, such as 2,2'-azobis(2-methylpropanenitrile) (CAS #78-67-1) available from DuPont under the designation VAZO 64, hereinafter referred to as "AIBN". Other suitable initiators include 2,2'-azobis(2,4-dimethylpentanenitrile) (CAS #4419-11-8) and 2,2'-azobis(2-methylbutanenitrile) (CAS #13472-08-7). The 2,2'-azobis(2-methylpropanenitrile) is preferred.

The catalyst is employed in amount of from about 0.15 to about 0.4 percent by weight, based on the combined weight of all the monomers to be polymerized. Desirably, polymerization is conducted under agitation. Typical polymerization times range from about 4 hours to about 8 hours. The monomer concentration in the reaction medium typically ranges from about 35 to about 70 percent by weight, based on the combined weight of reaction medium (THF glacial acetic acid) and the monomers.

Upon conclusion of the polymerization reaction, the polymer product is readily recovered from the reaction mixture, as by evaporation of the solvent and/or cooling the mixture to precipitate the polymer product, followed by separation of liquid and solid phases, as by filtration, and washing of the polymer product to remove residual unreacted monomers using any suitable solvent, if desired. These operation are conventional. Once recovered and purified, as here described, the polymer product seems to be insoluble in the polymerization mixture. However, it is nicely soluble in about equal volumes of THF and hexafluoroxylene, in concentrations of up to about 40 percent by weight, based on the combined weight of polymer product and solvent. Neither THF nor hexafluoroxylene by itself dissolves the polymer product. Solution of the polymer product in the mixed solvent is aided by mild heating and agitation. Examples 1 and 2, below, illustrate typical polymerization procedures.

EXAMPLE 1

This illustrates a typical synthetic procedure for perfluoroalkylethylacrylate terpolymer polymerization. A 500 ml 3-neck round bottom flask containing a large magnetic stirring "egg" is immersed in a thermostated oil bath on a stirring hot-plate. A stream of dry nitrogen is introduced through one of the necks to keep the polymerization mixture under nitrogen atmosphere throughout the polymerization. Another neck is stoppered. Through this neck the polymerization initiator is added by momentarily opening the stopper. The third neck is equipped with a pressure-equalizing dropping funnel. On top of this dropping funnel, a long vigeraux condenser is placed equipped on the top with a very narrow exit. Extra solvent is placed in the dropping funnel, which is dropped into the polymerization vessel in order to compensate for loss of solvent which may arise from the combination of nitrogen flow and elevated reaction temperature. With the above arrangement, each drop of solvent (which can also be a solution of a very reactive monomer in the same solvent) is swept by the nitrogen flowing in the opposite direction, i.e., by the dropping exit of the dropping funnel, on top of the solvent in this funnel, up through the vigeraux column and out through the narrow outlet.

The monomers are purified from any polymerization inhibitors that may be present, and the desired proportion is weighed into the round bottom flask. 72.10 g perfluoroalkylethylacrylate monomer mixture (Hoechst-Celanese NUVA FH), 7.34 g acrylic acid and 7.35 g 2-hydroxyethylacrylate are weighed into the flask. Their percentage weights are 83.09% NUVA FH, 8.46% acrylic acid and 8.45% 2-hydroxyethylacrylate. To this mixture, 105 ml tetrahydrofuran (THF) is added. The solution volume should be about half the volume of the round bottom flask. The mixture is stirred under nitrogen flow with very slow heating to about 40° C. for about an hour. Then there are added to the clear solution 0.27 g (0.3% by weight based on total monomer weight) of 2,2'-azobis(2-methylpropanenitrile) (AIBN) (duPont's VAZO 64), a convenient polymerization initiator. The polymerization mixture is slowly brought up to around 62° C. and the polymerization is allowed to proceed for several hours. Then the mixture is poured into a crystallization dish and most of the THF is stripped off. The residual materials are washed and comminuted in methanol, the unreacted monomeric species are washed away and the powdery white polymer is dried under high vacuum at temperatures not exceeding 50° C. The reduced viscosity of a polymer thus prepared was determined in a glass viscometer at 25° C. on a 2% solution of the polymer in 1:1 vol/vol mixture of THF and 1,3bis(trifluoromethyl)-benzene. A value of red=0.15 dL/g was obtained. NMR analysis indicated that the monomer composition in the terpolymer was extremely close to the feed composition. After spinning on silicon wafers and on glass substrates, refractive indices of n=1.3885, n=1.3890 and n=1.3865 were measured on three samples taken at random from a large population.

For the purpose of spin coating, mixtures of THF and 1,3-bis(trifluoromethyl)benzene in the range of 1:3 up to 3:1 were found to be the only acceptable ones, with the most desirable being a 1:1 vol/vol mixture. I have found no other solvent or solvent mixture from which acceptable coatings could be spun using commonly available spinners (e.g., Headway Research, Inc., PhotoResist Spinners) under ambient temperature and air humidity conditions.

Preparation of perfluoroalkylethylmethacrylate terpolymer follows the procedure set forth above in Example 1. In general, the intrinsic viscosities of the methacrylates are higher than those of the acryltes, i.e. in the order of about 0.25 dl/g vs. 0.13-0.15 dl/g. THF and glacial acetic acid were found to be suitable solvents to conduct the polymerization. However, two additional solvents were found for the methacrylic monomer mixture polymerization. These are 4-methyl-2-pentanone (MIBK) and 2-butanone (MEK). These solvents are not as good as THF for the purpose of the polymerization and MEK is poorer than MIBK. In MIBK and MEK the polymerizations are conducted at temperatures up to about 80° C., substantially above the 65° C. boiling point of THF. Workup is the same as for the acrylic polymers.

The above mentioned mixture of THF and 1,3-bis(trifluoromethyl)benzene in a preferable ratio of 1:1 vol/vol. ratio is a suitable solvent for spinning or spray-coating the polymers of this invention. A large number of solvents and solvent mixtures were tested for the purpose of spin coating, but only one solvent mixture was found to perform satisfactorily with respect to the high polymer solubility required for spin coating, and the evaporation rate of the solvent after the solution was spun on the substrate, namely the THF/1,3-bis(trifluoromethyl)benzene mixture in ratios of from 1:3 to 3:1, preferably in ratio of about 1:1, by volume. A typical spin-coating and thermal cross-linking (curing) procedure for perfluoroalkylethyl terpolymer is described in Example 2, below.

EXAMPLE 2

This example illustrates a coating application employing a fluropolymer composition of this invention.

The polymer is dissolved in the solvent mixture at a concentration producing a solution of sufficient viscosity for conventional spin coating. For the modest molecular weight polymers in this invention, a polymer concentration of about 20 wt/vol % is usually employed. A few drops of the solution are applied to the center of the substrate (silicon wafer, glass, etc.), and the system is spun in the spinner for about 30 seconds or less. The speed of spinning varies from ca. 2000 rpm up to over 5000 rpm.

When the spinning process is complete, the coated substrate is removed from the spin-head, placed in an oven and cured at temperatures of 130° C. up to 200° C., preferably between about 130° C. and about 180° C., for 1 to 4 hours. A self-crosslinked coating is obtained. The coating is tenaciously attached to the substrate and is not removed by scratching, masking-tape crosshatch procedure, immersion in solvents or acids, etc. For systems containing over ca. 75 wt. % perfluoroalkylethyl-(meth)acrylate comonomer, the refractive index is, as a rule, less than 1.400.

Polymer systems of the type above described which are very rich in the fluoromonomers i.e. those containing more than about 98 percent by weight of fluromonomer-derived units, may tend to peel off the substrate during the curing process, and they have a tendency to develop haze and partial crystallinity upon cooling from the curing temperature, which is undesirable in some applications. These problems are readily avoided by reducing the fluoromonomer content.

EXAMPLE 3-7

Following the procedure outlined in Examples 1 and 2 above, terpolymer compositions of the present invention were prepared using as the fluorine-containing monomer a perfluoroalkylethyl acrylate having the general composition $CH_2=CHCOO(CH_2)_2C_nF_{2n+1}$, which was a mixture of compounds of varying n-values with this approximate $C_nF_{2n+1}$ distribution: $C_6 \approx 8\%$; $C_8 \approx 57\%$; $C_{10} \approx 27\%$; $C_{12} \approx 6\%$; and $C_{14} \approx 2\%$. The material was obtained from Hoechst-Celanese under the designation NUVA-HF (trademark). The result in each instance was a spinnable polymer composition, suitable for the above-indicated uses. The results are summarized in Table 1, below.

TABLE 1

| Ex. | Fluoro Acrylate Wt. % | Solvent/ Monomer Vol./Wt. ml/g | Co-Monomers and Remarks |
|---|---|---|---|
| 3 | 82.8 | THF 1.2:1 | 17.2 wt. % of 1:1 wt./wt. of acrylic acid/2-hydroxyethyl acrylate |
| 4 | 83.7 | THF 1.4:1 | 16.3 wt. % of 1:1 wt./wt. of acrylic acid/2-hydroxyethyl acrylate |
| 5 | 83.4 | THF 2.1:1 | 16.6 wt. % of 1:1 wt./wt. of acrylic acid/2-hydroxyethyl acrylate |
| 6 | 84.7 | MIBK 1.28:1 | 15.3 wt. % of 1:1 wt./wt. of methacrylic acid/2-hydroxyethyl methacrylate |
| 7 | 82.3 | MIBK | 17.7 wt. % of 1:1 wt./wt. of acrylic acid/2-hydroxyethyl acrylate - crystallized. |

EXAMPLES 8-21

Following the procedure outlined in Examples 1 and 2, above, terpolymer compositions of the present invention were prepared using as the fluorine-containing monomer a perfluoroalkylethyl methacrylate having the general composition $CH_2=CCH_3COO(CH_2)_2C_nF_{2n+1}$, which was a mixture of compounds of varying n-values, with this approximate distribution: $C_4 \approx 4\%$; $C_6 \approx 34\%$; $C_8 \approx 29$; $C_{10} \approx 15\%$; $C_{12} \approx 7\%$; $C_{14} \approx 5\%$ $C_{16} \approx 3\%$; $C_{18} \approx 2\%$; and $C_{20} \approx 1\%$. The material was obtained from DuPont under the designation ZONYL-TM (trademark). The result in each instance was a spinnable polymer composition, suitable for the above-indicated uses. The results are summarized in Table 2, below.

TABLE 2

| Ex. | Fluoro Methacrylate Wt. % | Solvent/ Monomer Vol./Wt. | Co-Monomers and Remarks |
|---|---|---|---|
| 8 | 83.6 | THF 1.15:1 | 16.4 wt. % of 1:1 wt./wt. of methacrylic acid/2-hydroxyethyl methacrylate System became too viscous to stir. |
| 9 | 82.8 | THF 2.12:1 | 17.2 wt. % of 1:1 wt./wt. of methacrylic acid/2-hydroxyethyl methacrylate |
| 10 | 80.0 | THF 2:1 | 20 wt. % of 1:1 wt./wt. of methacrylic acid/2-hydroxyethyl methacrylate |
| 11 | 87.8 | THF 1.16:1 | 12.2 wt. % of 1:1 wt./wt. of methacrylic acid/2-hydroxyethyl methacrylate Added THF from dropping funnel. |
| 12 | 90.1 | THF 1.21:1 | 9.9 wt. % of 1:1 wt./wt. of methacrylic acid/2-hydroxyethyl methacrylate Added THF from dropping funnel. |
| 13 | 65.0 | THF 1.74:1 | 35 wt. % of 1:1 wt./wt. of methacrylic acid/2-hydroxyethyl methacrylate Added THF from dropping funnel. |
| 14 | 47.8 | THF 1.38:1 | 52.2 wt. % of 1:1 wt./wt. of methacrylic acid/2-hydroxyethyl methacrylate Polymeric product insoluble in 1:1 THF/hexafluoroxylene. |
| 15 | 82.7 | THF 2:1 | 13.3 wt. % of 1:1 wt./wt. of methoxymethylmethacrylate/ methacrylic acid |
| 16 | 83.8 | Toluene 2:1 | 14.2 wt. % of 1:1 wt./wt. of hydroxyethylmethacrylate/ methacrylic acid |
| 17 | 78.8 | MIBK 1.61:1 | 21.2 wt. % of 1:1 wt./wt. of hydroxyethylmethacrylate/ methacrylic acid |
| 18 | 83.6 | Dioxane 1.48:1 | 16.4 wt. % of 1:1 wt./wt. of hydroxyethylmethacrylate/ methacrylic acid |
| 19 | 73.2 | MEK | 26.8 wt. % of 1:1 wt./wt. of hydroxyethylmethacrylate/ methacrylic acid |
| 20 | 83.7 | None | 16.3 wt. % of 1:1 wt./wt. of hydroxyethylmethacrylate/ methacrylic acid Rapid precipitation and solidification. |
| 21 | 80.0 | THF | 16.3 wt. % of 1:1 wt./wt. of hydroxyethylmethacrylate/ methacrylic acid |

EXAMPLE 22

This example illustrates use of glacial acetic acid as polymerization medium. 98 61 g (79.8 wt. %) of the fluoromethacrylate (DuPont's Zonyl-TM), 13.15 g (10.6 wt. %) hydroxymethyl acrylate, and 12.3 g (9.9 wt. %) methacrylic acid were polymerized in 150 ml glacial acetic acid at 72° C. over a 6 hour period, using 0.37 g AIBN as catalyst. The polymerization progressed remarkably well, and the polymeric product remained soluble in the mixture. The polymer precipitated out of the acetic acid at temperatures below about 50° C. The reaction mixture was poured into water, the polymer precipitated, and was recovered in the usual manner. The yield was 93.6%. Attempts to dissolve the recovered polymer product in hot acetic acid failed.

EXAMPLE 23

This example illustrates conjoint use of the fluoro acrylate and methacrylate. 75.81 g (40.8 wt. %) of the perfluoroalkyl methacrylate (DuPont's Zonyl-TM), 72.3 g (38.9 wt. %) of the perfluoroalkyl acrylate (Hoechst-Celanese NUVA HF), 17.61 g (9.5 wt. %) of methacrylic acid, and 19.98 g (10.8 wt. %) of 2-hydroxyethyl methacrylate were polymerized in 300 ml THF, using 0.55 g AIBN as initiator, employing above-described procedure. Yield: 79.1%.

EXAMPLE 24

This example illustrates incorporation of a simple methacrylic acid ester as an additional component. 80.62 g (78.68 wt. %) of the perfluoroalkyl methacrylate (DuPont's Zonyl-TM), 6.28 g (6.13 wt. %) of of methacrylic acid, 8.34 g (8.14 wt. %) of 2-hydroxyethyl methacrylate and 7.22 g (7.05 wt. %) of methylmethacrylate were polymerized in 150 ml THF, using 0.31g AIBN as initiator, employing above-described procedure. The resultant polymer had all of the desirable properties of the invention polymers, including the ability to be thermally cross-linked.

This example illustrates that incorporation of other than hydroxyl-group containing or fluorinated acrylic esters is possible, and the appended claims are intended to cover polymeric compositions containing incidental amounts, say up to about 10% by weight of other comonomers, and particularly of acrylic esters, which do not interfere with the polymerization, and which do not deleteriously affect desirable properties of the polymer product. Examples of such incidental, additional monomeric materials include alkoxy methylacrylates and methylmethacrylates (such as methoxy, ethoxy, propoxy, butoxy and higher methylacrylates and methylmethacrylates); epoxy alkylmethacrylates; alkyl acrylates and methacrylates, including haloalkyl derivatives thereof, such as chloroalkyl acrylates and methacrylates; and the like.

EXAMPLE 25

This example illustrates equimolar use of the non-fluorinated monomers 81 9 g (80.16 wt. %) of the perfluoroalkyl methacrylate (DuPont's Zonyl-TM), 8.08 g (7.91 wt. %) of of methacrylic acid, and 12.9 g (11.93 wt. %) of 2-hydroxyethyl methacrylate were polymerized in 155 ml THF, using 0.3 g AIBN as initiator, employing above-described procedure. Yield: 82.7%. The resultant polymer, when thermally cured as above described at temperatures within the range of from about 130° C. to about 150° C. will cross-link predominantly through formation of internal ester linkages.

EXAMPLE 26

This example provides an illustration of a polymer containing a relatively high proportion of the hydroxyl-group bearing acrylate ester, which polymer, on heat treatment as above described, will tend to predominantly cross-link through ester formation. 104.88 g (80.66 wt. %) of the perfluoroalkyl methacrylate (DuPont's Zonyl), 7.54 g (5.8 wt. %) of methacrylic acid, and 17.61 g (13.54 wt. %) of 2-hydroxyethyl methacrylate were polymerized in 200 ml THF, using 0.34 g AIBN as initiator, employing above-described procedure. Yield: 82.7%.

When the ratio of the Y-component (acid component) to the Z-component (hydroxyl- bearing acrylic ester) in the polymeric composition of this invention is larger than 1.0, then the preferred curing product is the anhydride. When the ratio is smaller than 1.0, an ester is the preferred product, with some hydroxyl groups remaining unreacted. When the ratio is 1.0, then the preferred product is the ester, with practically all the hydroxyl groups being consumed.

The products of Examples 10, 12, 13, 21 and 22 were compresssion molded in a Carver Press at elevated temperature under pressure of 1 080–1 510 kg to form 0.5 mm thick round test plaques of 5 cm diameter, for dielectric tests. These tests were conducted at 0% and 50% Relative Humidity. The samples were stored in a 0% Relative Humidity chamber for 6 days, and thereafter their dielectric constant was determined. Immediatly after being tested, the samples were stored in a 50% Relative Humidity chamber at 25° C. for one week, and the samples were again tested. The results are summarized in Table 3, below

TABLE 3

| Product of Example | Plaque-Forming Conditions | Dielectric Constant at 0% R.H. | at 50% R.H. |
| --- | --- | --- | --- |
| 10 | 2 hr. @ 145° C. | 2.942 | 3.089 |
| 10 | 4 hr. @ 170° C. | 2.866 | 3.064 |
| 12 | 1 hr. @ 145° C. | 3.128 | 3.033 |
| 12 | 2 hr. @ 145° C. | 3.152 | 3.068 |
| 13 | 1 hr. @ 145° C. | 3.125 | 3.431 |
| 21 | 1 hr. @ 145° C. | 3.178 | 3.076 |
| 22 | 3 hr. @ 145° C. | 2.896 | 3.076 |

These data show that the polymer compositions of this invention have utility for demanding electric and electronic applications, where their good physical properties and resistance to attack can be used to advantage.

As previously indicated, the polymeric compositions of this invention can also be cross-linked employing conventional cross-linking agents, such as, for example, diisocyanates, carbodiimides, diacid chlorides, and the like. Examples of specific effective crosslinking agents include hexamethylenediisocyanate, methylene di-p-phenyldiisocyanate, 1,3-dicyclohexyl carbodiimide, dodecanedioyl dichloride and adipoyl chloride. The crosslinking agents are employed in amounts conventionally employed to obtain desired cross-linking of the polymer which, by use of such agents, can take place at ambient temperatures.

Since various changes may be made in the invention without departing from its spirit and essential characteristics, it is intended that all matter contained in the description shall be interpreted as illustrative only and not in a limiting sense, the scope of the invention being defined by the appended claims.

I claim:

1. Polymeric compositions comprising fluorinated copolymers of the formula

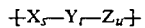

wherein s, t and u represent weight proportions of the respective X, Y and Z units, and have values within the ranges of s = from about 0.5 to about 0.99;
t = from about 0.005 to about 0.495; and
u = from about 0.005 to about 0.495;

with the sum of s+t+u being 1; and with the proviso that the ratio of t:u is from about 1:0.5 to about 1:1.5;

X represents units of the composition

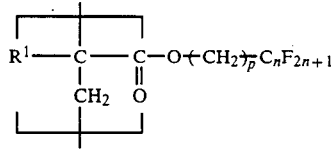

wherein
$R^1$ is H, —$CH_3$ or mixtures thereof;
p is 1 or 2;
n is an integer of from about 1 to about 40;
Y represents units of the composition

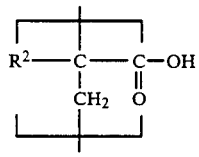

wherein $R^2$ is H, —$CH_3$, or —$CH_2COOH$;
Z represents units of the composition

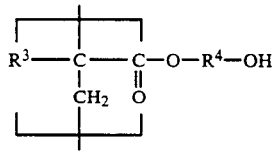

wherein
$R^3$ is H, —$CH_3$, or —$CH_2COOC_mH_{2m+1}$, wherein m is an integer of from about 1 to about 4; and
$R^4$ is an alkylene bridging group, straight chain, branched or cyclic, having from 1 to about 8 carbon atoms;
wherein the X, Y and Z units may be arranged in any sequence.

2. Compositions according to claim 1 wherein $R^1$ is —$CH_3$.

3. Compositions according to claim 1 wherein $R^1$ is H.

4. Compositions according to claim 1 wherein X represents a mixture of units bearing H and —$CH_3$ as the $R^1$ substituent.

5. Compositions according to claims 1, 2 or 3 wherein p is 2.

6. Compositions according to claim 1 wherein $R^2$ and $R^3$, which may be the same or different within each of the X and Y units, are each independently H or —$CH_3$; $R^4$ is an alkylene bridging group, straight chain or branched, having from about 2 to about 4 carbon atoms; and p is 2.

7. Compositions according to claim 6 wherein s ranges from about 0.70 to about 0.95.

8. Compositions according to claim 6 wherein s ranges from about 0.75 to about 0.85.

9. Compositions according to any one of claims 1, 6 and 8 wherein Y and Z are present in about equimolar proportions.

10. Compositions according to claim 6 wherein, in the —$C_nF_{2n+1}$ groups of the X units, n ranges from about 2 to about 30.

11. Compositions according to claim 6 wherein, in the $—C_nF_{2n+1}$ groups of the X units, n ranges from about 2 to about 20.

12. Compositions according to claim 6 wherein the X groups are derived from a perfluoroalkylethyl acrylate, the Y groups are derived from acrylic acid, and the Z groups are derived from an ω-hydroxyalkyl acrylate.

13. Compositions according to claim 6 wherein the X groups are derived from a perfluoroalkylethyl acrylate, the Y groups are derived from methacrylic acid, and the Z groups are derived from an ω-hydroxyalkyl acrylate.

14. Compositions according to claim 6 wherein the X groups are derived from a perfluoroalkylethyl acrylate, the Y groups are derived from acrylic acid, and the Z groups are derived from an ω-hydroxyalkyl methacrylate.

15. Compositions according to claim 6 wherein the X groups are derived from a perfluoroalkylethyl acrylate, the Y groups are derived from methacrylic acid, and the Z groups are derived from an ω-hydroxyalkyl methacrylate.

16. Compositions according to claim 6 wherein the X groups are derived from a perfluoroalkylethyl methacrylate, the Y groups are derived from acrylic acid, and the Z groups are derived from an ω-hydroxyalkyl acrylate.

17. Compositions according to claim 6 wherein the X groups are derived from a perfluoroalkylethyl methacrylate, the Y groups are derived from methacrylic acid, and the Z groups are derived from an ω-hydroxyalkyl acrylate.

18. Compositions according to claim 6 wherein the X groups are derived from a perfluoroalkylethyl methacrylate, the Y groups are derived from acrylic acid, and the Z groups are derived from an ω-hydroxyalkyl methacrylate.

19. Compositions according to claim 6 wherein the X groups are derived from a perfluoroalkylethyl methacrylate, the Y groups are derived from methacrylic acid, and the Z groups are derived from an ω-hydroxyalkyl methacrylate.

20. Compositions according to claim 6 wherein the X groups are derived from mixed perfluoroalkylethyl methacrylate and perfluoroalkylethyl acrylate, the Y groups are derived from methacrylic acid, and the Z groups are derived from an ω-hydroxyalkyl acrylate.

21. Compositions according to claim 6 wherein the X groups are derived from mixed perfluoroalkylethyl methacrylate and perfluoroalkylethyl acrylate, the Y groups are derived from acrylic acid, and the Z groups are derived from an ω-hydroxyalkyl methacrylate.

22. Compositions according to claim 6 wherein the X groups are derived from mixed perfluoroalkylethyl methacrylate and perfluoroalkylethyl acrylate, the Y groups are derived from methacrylic acid, and the Z groups are derived from an ω-hydroxyalkyl methacrylate.

23. Compositions according to claim 6 wherein the X groups are derived from mixed perfluoroalkylethyl methacrylate and perfluoroalkylethyl acrylate, the Y groups are derived from acrylic acid, and the Z groups are derived from an ω-hydroxyalkyl acrylate.

24. Compositions according to any one of claims 12, 13, 16, 17, 20 and 23 wherein the ω-hydroxyalkyl acrylate is 2-hydroxyethyl acrylate.

25. Compositions according to anyone of claims 14, 15, 18, 19, 21 and 22 wherein the ω-hydroxyalkyl methacrylate is 2-hydroxyethyl methacrylate.

26. A substrate having deposited thereon a layer of a composition according to any one of claims 1, 6, 8, 9 and 11.

* * * * *